US006801833B2

(12) United States Patent
Pintsov et al.

(10) Patent No.: US 6,801,833 B2
(45) Date of Patent: Oct. 5, 2004

(54) METHOD FOR MAINTAINING THE INTEGRITY OF A MAILING USING RADIO FREQUENCY IDENTIFICATION TAGS

(75) Inventors: Leon A. Pintsov, West Hartford, CT (US); Kwan C. Wong, Milford, CT (US); Kenneth G. Miller, Bethel, CT (US); John H. Winkelman, Southbury, CT (US); Kevin W. Bodie, Brookfield, CT (US)

(73) Assignee: Pitney Bowes Inc., Stamford, CT (US)

( * ) Notice: Subject to any disclaimer, the term of this patent is extended or adjusted under 35 U.S.C. 154(b) by 259 days.

(21) Appl. No.: 10/238,864

(22) Filed: Sep. 10, 2002

(65) Prior Publication Data

US 2004/0049316 A1 Mar. 11, 2004

(51) Int. Cl.[7] .................................................. G06F 7/00

(52) U.S. Cl. ....................... 700/223; 700/224; 700/226; 700/229

(58) Field of Search ................................ 700/223, 224, 700/225, 227, 229, 226; 705/28; 235/384, 385

(56) References Cited

U.S. PATENT DOCUMENTS

| | | | | |
|---|---|---|---|---|
| 5,043,908 | A | 8/1991 | Manduley et al. | 364/478 |
| 5,971,587 | A | 10/1999 | Kato et al. | |
| 5,978,781 | A | 11/1999 | Sansone | 705/408 |
| 6,188,996 | B1 | 2/2001 | Sansone | 705/408 |
| 6,208,910 | B1 | 3/2001 | Michael et al. | 700/225 |
| 6,211,781 | B1 | 4/2001 | McDonald | 340/505 |
| 6,249,227 | B1 | 6/2001 | Brady et al. | 340/572.1 |
| 6,259,369 | B1 | 7/2001 | Monico | |
| 6,260,029 | B1 | 7/2001 | Critelli | |
| 6,496,806 | B1 * | 12/2002 | Horwitz et al. | 705/28 |
| 6,669,089 | B2 * | 12/2003 | Cybulski et al. | 235/385 |
| 2001/0032190 | A1 | 10/2001 | Ediger et al. | |
| 2001/0040513 | A1 | 11/2001 | McDonald | |
| 2002/0029153 | A1 | 3/2002 | Lee et al. | |

* cited by examiner

*Primary Examiner*—Gene O. Crawford
(74) *Attorney, Agent, or Firm*—Ronald Reichman; Angelo N. Chaclas

(57) ABSTRACT

This invention creates a hierarchy of radio frequency identification tags that are related to the mail pieces in mail trays and the pallet on which the mail trays sit. This hierarchical method provides a layered approach that is designed to minimize the probability that a mailer or the post office will misassemble or misroute a mailing or elements of a mailing.

16 Claims, 5 Drawing Sheets

METHOD FOR MAINTAINING THE INTEGRITY OF A MAILING USING RADIO FREQUENCY IDENTIFICATION TAGS

CROSS REFERENCE TO RELATED APPLICATIONS

Reference is made to commonly assigned co-pending patent applications Docket No. F-457 filed herewith entitled "Method For Detecting And Redirecting Misdirected Mail" in the names of Ronald P. Sansone, Claude Zeller, Robert A. Cordery, Marc Morelli, Arthur Parkos, Leon A. Pintsov and Ronald Reichman; Docket No. F-483 entitled "Method For Processing And Delivering Registered Mail" in the name of Leon A. Pintsov; and Docket No. F-484 filed herewith entitled "Method For Detecting And Redirecting Major Mailer's Special Service Mail" in the name of Ronald P. Sansone.

FIELD OF THE INVENTION

The invention relates generally to the field of mailing systems and, more particularly, to systems for maintaining the integrity of a mailing.

BACKGROUND OF THE INVENTION

Governments have created post offices for collecting, sorting and distributing the mail. The postal service typically charges mailers for delivering the mail. Mailers may pay the post office for its service by purchasing a stamp, i.e., a printed adhesive label, issued by the post office at specified prices that is affixed to all letters, parcels or other mail matter to show prepayment of postage.

Another means of payment accepted by the post office is mail that is metered by a postage meter. A postage meter is a mechanical or electromechanical device that maintains, through mechanical or "electronic registers" or "postal security devices," an account of all postage printed, and the remaining balance of prepaid postage; and prints postage postmarks (indicia) or provides postage postmarks (indicia) information to a printer that are accepted by the postal service as evidence of the prepayment of postage.

Other methods of payment accepted by the post office are for manifest mail and permit mail. In a typical manifest mailing system, a mailer produces mail in accordance with a mail manifest list and determines the quantity of mail and weight thereof. Then the mailer prepares the appropriate postal forms and delivers the mail and forms to the post office. Then, the post office checks the manifest list, the appropriate forms and checks the quantity and weight of the mail. The post office also requires permit imprints to be printed on the mail piece. The mailer prepares postal forms and brings the mail and postal forms to the post office. The post office checks the forms, checks the mail pieces and confirms that the completed forms coincide with the checked mail pieces. Then the postal clerk debits the value of the postage placed on the mail pieces from the mailer's postal account. Groups of individuals and businesses that produce very large quantities of mail use manifest and permit mail.

Major mailers typically use manifest and permit mail for their bulk mailings. Correspondences, bills, sales literature, marketing material, advertisements, coupons, dunning letters, etc. may be inserted into mail pieces produced by major mailers. Files that represent the mail piece are typically stored in a computer where the files may be presorted for the trays in which they will be transported.

A disadvantage of the prior art is that it is difficult for the post office to maintain the integrity of the mail pieces in a bulk mailing.

SUMMARY OF THE INVENTION

This invention overcomes the disadvantages of the prior art by reducing the cost to the mailer and the post office or other carrier to prepare and process bulk mailings while maintaining the integrity of the mail pieces in a bulk mailing.

The foregoing is accomplished by constructing a hierarchy of radio frequency identification tags that are related to the mail pieces in mail trays and the pallet on which the mail trays sit. This hierarchical method provides a layered approach that is designed to minimize the probability that a mailer or the post office will misassemble or misroute a mailing or elements of a mailing.

From a mailing integrity point of view, a cross-reference between hierarchical components of the invention is established, namely mail piece, tray or sack containing mail pieces, palette containing trays, and vehicle containing palettes. The hierarchical components of the system are typically under the control of different entities. For example, mail pieces and trays and sacks are under the control of the mailer during the mail generation process. On the other hand, palettes and vehicles are under the control of the post office and/or an independent transportation contractor. Thus, various means of identification may be employed and, when desired, the information may be encrypted for the exchange of information between the hierarchical components; i.e., communication networks, telephone, internet, CD ROMs, etc.

DETAILED DESCRIPTION OF THE PREFERRED EMBODIMENT

Figure 1:
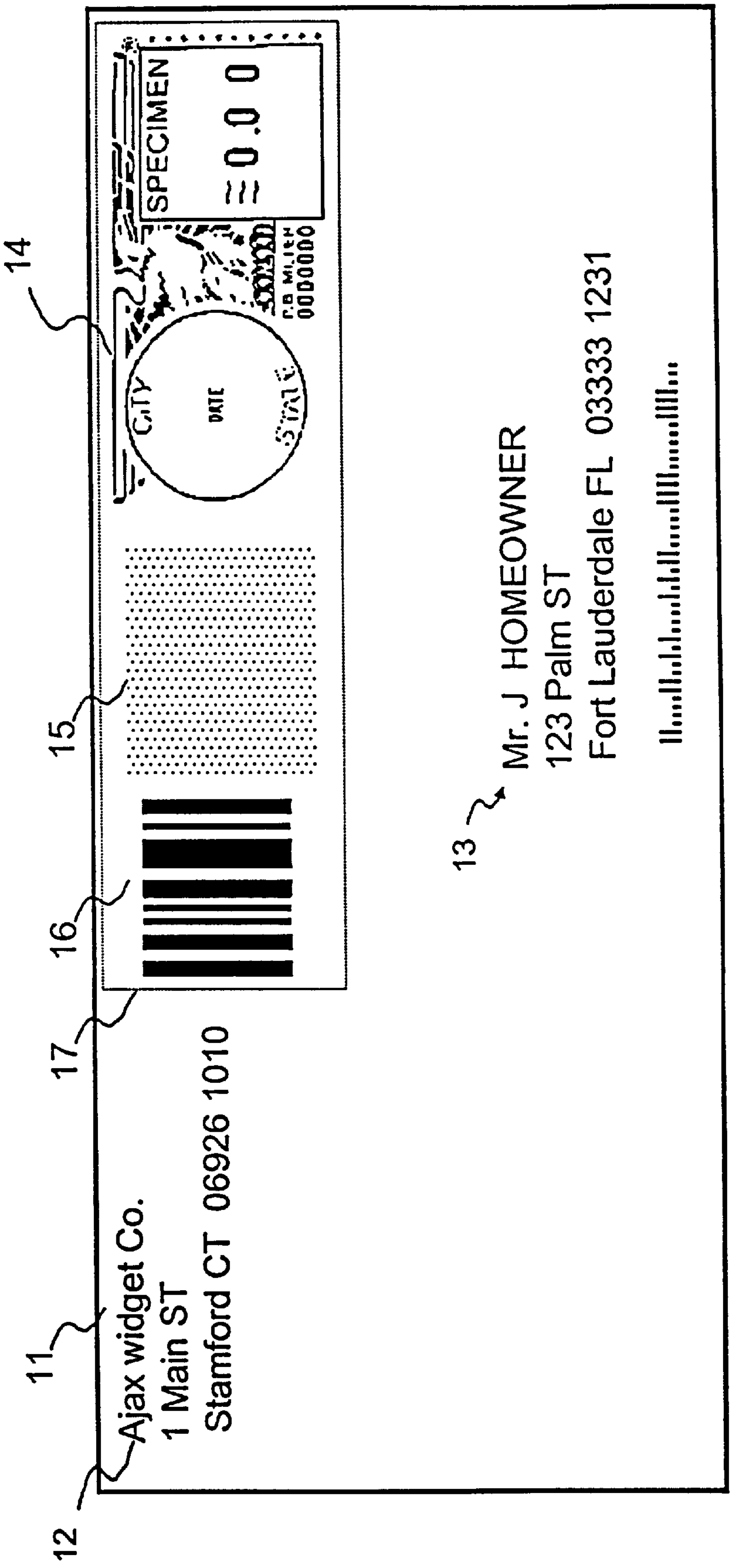
FIG. 1 is a drawing of a mail piece having a radio frequency identification tag.

Referring now to the drawings in detail and, more particularly, to FIG. 1, the reference character 11 represents a mail piece that has a sender address field 12, a recipient address field 13, a postal indicia 14, a radio frequency identification tag 15, and a bar code 16 that contains specified information. Radio frequency identification (RFID) tag 15 may be the 4×6 RFID Smart Label Philips manufactured by RAFEC USA of 999 Oakmont Plaza Drive, Suite 200, Westmont, Ill. 60559. The information contained in tag 15 is the sender address field 12, recipient address field 13, and reference information for tray, palette, and vehicle units that may contain a mail piece with a tag 15. The reference information in tag 15 is a unique identifier of the mail piece. The unique identifier may contain an eight-digit mailer account number, a four-digit date indicator, a six-digit tray identification, three digits to identify the mail piece within the tray, the electronic or e-mail address of the mailer, six digits to indicate a value for the contents of the mail piece, four digits to indicate the contents of the mail piece, and a three-digit code that identifies the mail carrier. If the mail pieces have been presorted by the mailer, tag 15 may also contain the postal code, i.e., zip code, of the recipient to allow for the mail pieces to be returned to the tray if they are accidentally removed from the tray.

The information that represents the value of the contents and the information that indicates the contents in tag 15 may be encrypted or digitally signed for the purpose of protecting the information from unauthorized use. It would be obvious to one skilled in the art that other information may be used to uniquely identify mail piece 11. The information written into tag 15 may be by a radio frequency identification tag printer (not shown). The radio frequency identification tag printer may be the Zebra R140 printer manufactured by Zebra Technologies Corporation of 333 Corporate Woods Parkway, Vernon Hills, Ill., 60061. Indicia 14 and tag 15 may be placed on a paper tape 17 that is affixed to mail piece 11, or indicia 14 may be printed directly on mail piece 11, and tag 15 affixed to mail piece 11.

Figure 2:
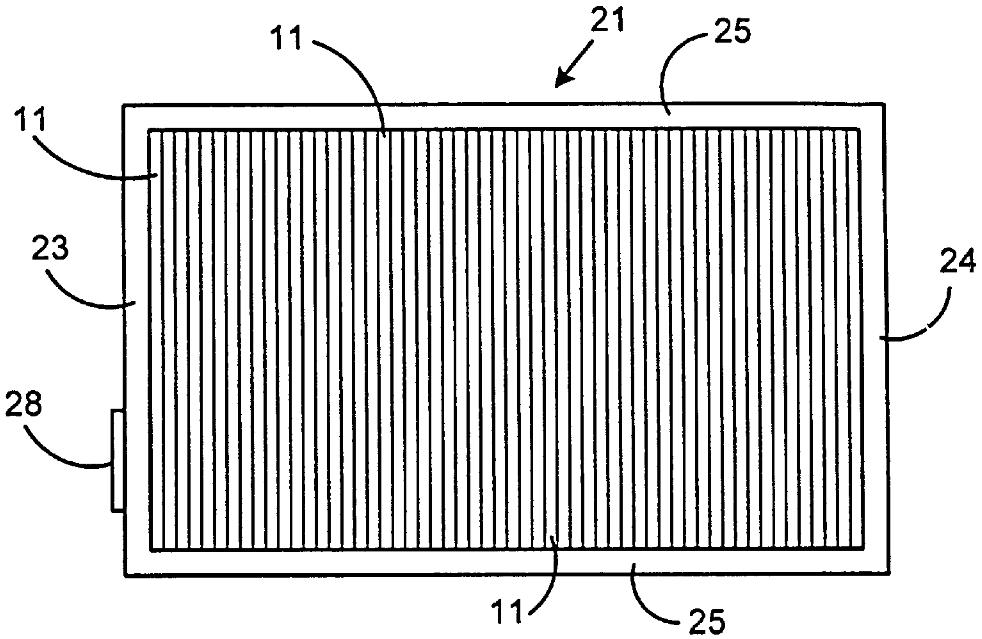
FIG. 2 is a drawing of a top view of a mail tray containing mail pieces.

FIG. 2 is a drawing of a top view of a mail tray containing mail pieces 11. Mail pieces 11 have a tag 15 (not shown) affixed to mail pieces 11. Mail tray 21 contains a plurality of mail pieces 11 that are placed in tray 21 in a manner that one of the edges of mail pieces 11, preferably the top edge of mail pieces 11, run along the top of tray 21. Tray 21 has a front panel 23, a back panel 24, and side panels 25 as well as a bottom panel (not shown). Mail pieces 11 have been placed in tray 21 in such a manner that the mailer may be qualified to receive a postal discount. RFID tag 28 is affixed to front panel 23 of tray 21. The information in tag 28 may be an eight-digit mailer account number, a four-digit date indicator, a six-digit tray identification, an eleven-digit postal code, an electronic or e-mail address of the local carrier office, and three digits to identify the mail piece within the tray.

Figure 3:
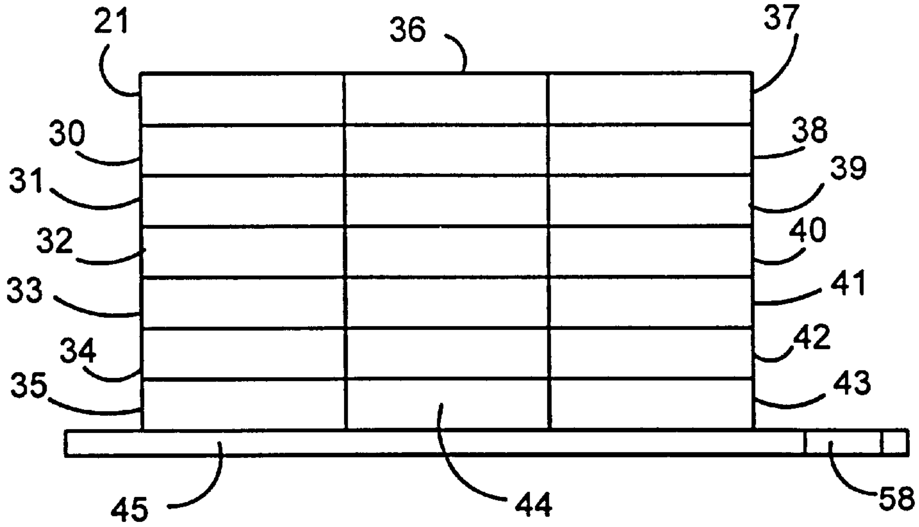
FIG. 3 is a drawing of a side view of a palette containing a plurality of mail trays.

FIG. 3 is a drawing of a side view of a palette 45 containing a plurality of mail trays. Trays 21 and 30–44 are held by palette 45. RFID tag 58 is affixed to palette 45. Tag 58 contains information indicating the mailer's account numbers of the mailers having trays in the palette, a code indicating the identity of the local postal operator who formed the palette, a date indicator, a list of trays in the palette, the destination of the palette, the electronic or e-mail address of the local carrier office and the identity of the vehicle that is going to transport the palette.

During the processes of mail creation, tray formation, palette formation and transportation, broadly accessible and expandable data bases 151 and 154 (FIG. 6) are maintained. For example, during the mail creation process, the mailer creates identities of individual mail pieces and trays and places them in accessible and expandable data bases. These data bases are made available to all subsequent processes. For instance, during palette formation, the data base is updated by the postal operator by adding palettes identities to the palette.

Figure 4:
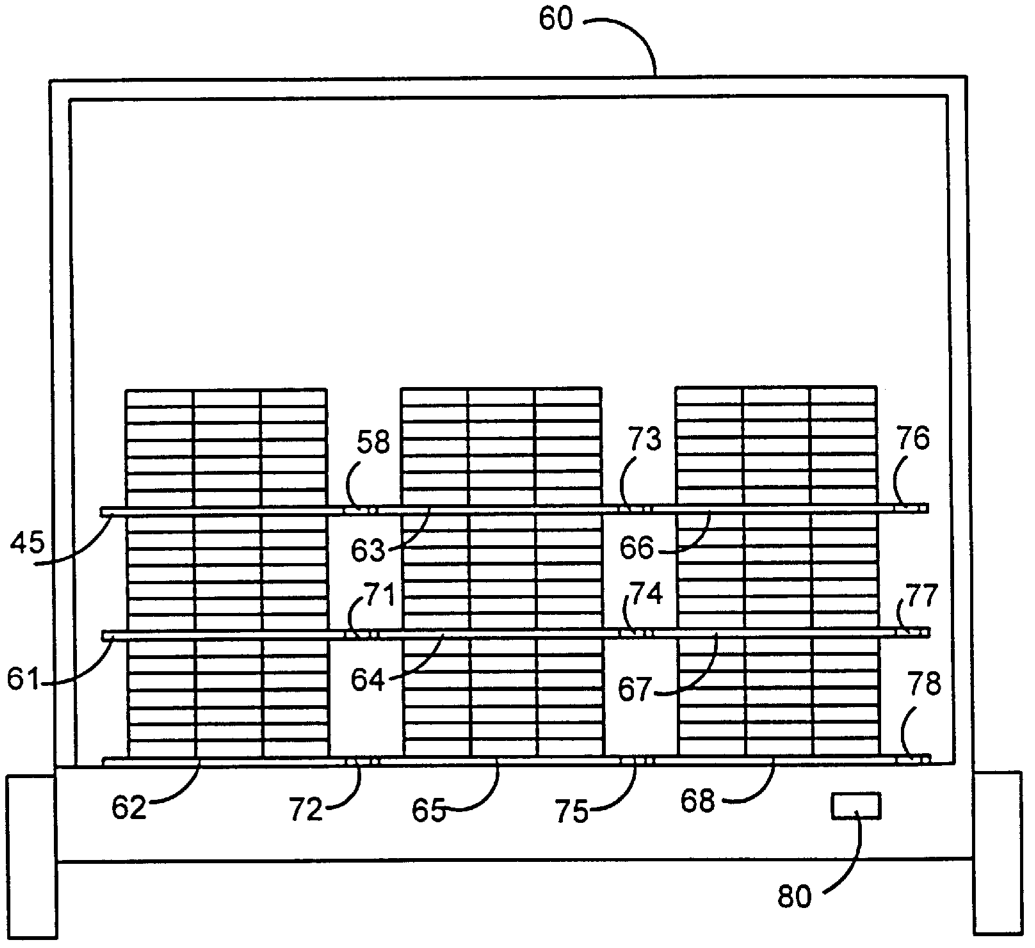
FIG. 4 is a drawing of an end view of a vehicle containing a plurality of palettes.

FIG. 4 is a drawing of an end view of a vehicle containing a plurality of palettes. Vehicle 60 contains palettes 45 and 61–68, wherein each palette holds a plurality of mail trays. RFID tag 58 is affixed to palette 45, and RFID tag 71 is affixed to palette 61. RFID tag 72 is affixed to palette 62, and RFID tag 73 is affixed to palette 63. RFID tag 74 is affixed to palette 64, and RFID tag 75 is affixed to palette 65. RFID tag 76 is affixed to palette 66, and RFID tag 77 is affixed to palette 67. RFID tag 78 is affixed to palette 68. RFID tag 80 is affixed to vehicle 60. Tag 80 contains information indicating the owner of the vehicle, the identity of the vehicle, the operator of the vehicle, a list of palettes in the vehicle, the date, a list of vehicle destinations, flight number or route of the vehicle and the electronic or e-mail address of the owner of the vehicle.

Tags 15, 28, 58 and 80 may also contain information integrity data. Information integrity data is data that provides a verifier assurance that the data in the identifier has not been deliberately changed or inadvertently altered. For example, for the detection of inadvertent errors detection, error correction codes well-known in the art may be employed, while for detection of deliberate alteration of information, cryptographic tools such as digital signatures or message authentication codes may be used.

Figure 5:
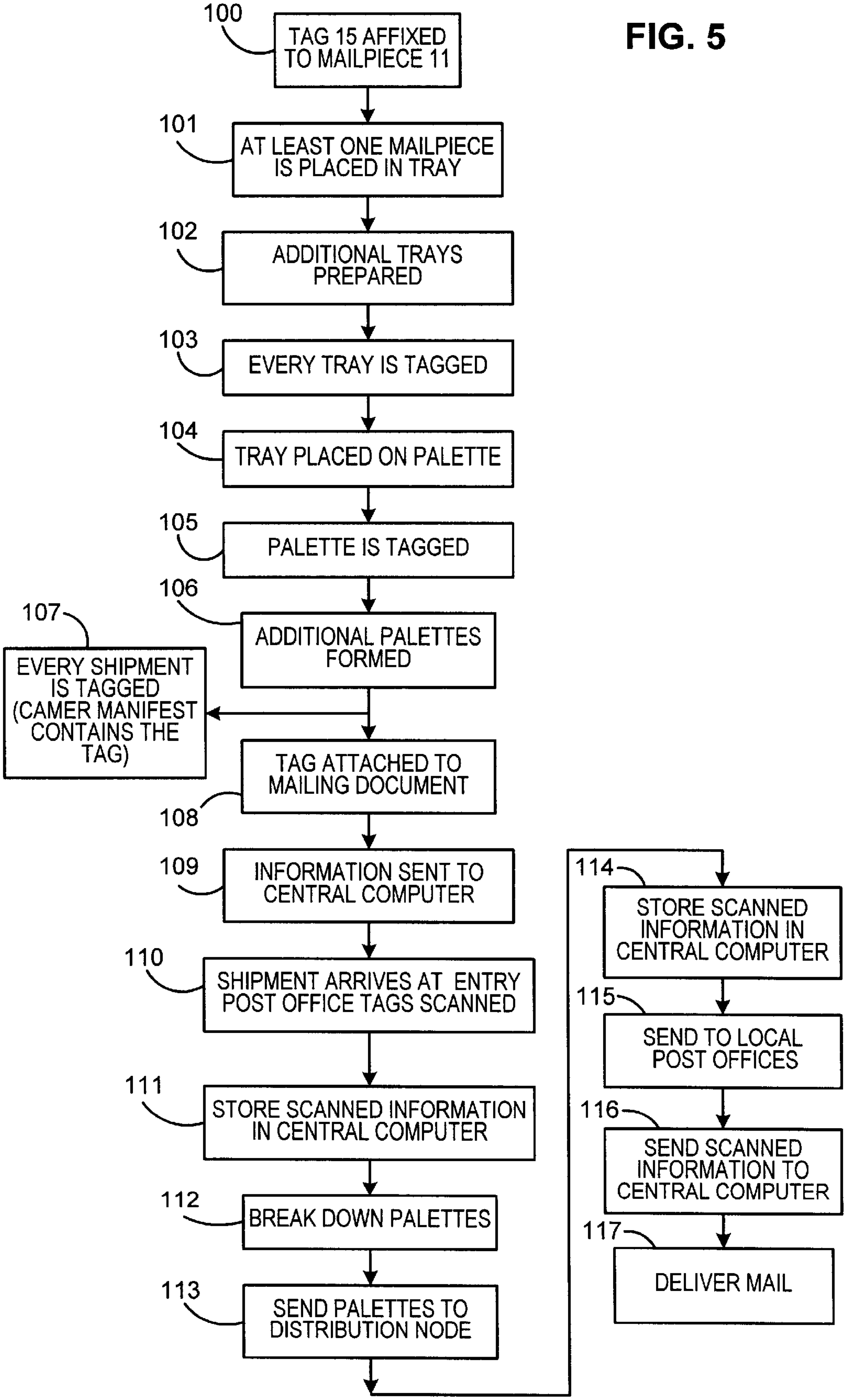
FIG. 5 is a drawing showing the process steps in the tracking of bulk mailings through the post office.

FIG. 5 is a drawing showing the process steps in the tracking of bulk mailings through the post office. The process begins in block 100 where RFID tag 15 is affixed to mail piece 11. The information contained in tag 15 is the sender address field 12, recipient address field 13, and reference information for tray, palette, and vehicle units that may contain a mail piece with a tag 15. The reference information in tag 15 is a unique identifier of the mail piece. The unique identifier may contain, an eight-digit mailer account number, a four-digit date indicator, a six-digit tray identification, three digits to identify the mail piece within the tray, the electronic or e-mail address of the mailer, six digits to indicate a value for the contents of the mail piece, four digits to indicate the contents of the mail piece, and a three-digit code that identifies the mail carrier.

In block 101, mail piece 11 is placed in tray 21. The remaining mail pieces that are placed in tray 21 may or may not contain RFID tags. The mailer prepares additional trays for the mailing in block 102. In block 103, every tray will be issued a RFID tag. As mail pieces are added to the tray, the RFID tag on the tray is programmed such that it contains information about the mail pieces in the tray. Once the tray is filled with mail pieces, the tray is placed on palette 45 that is a part of a bulk mail shipment in block 104. In block 104, RFID tag 58 is programmed to contain information about the trays held by the palette and information regarding the bulk mail shipment. In block 105, trays are placed on other palettes, and RFID tags that contain information about the trays held by the palette and information regarding the bulk mail shipment are affixed to the palettes.

In block 106, additional palettes that comprise the bulk mail shipment are formed. In block 107, RFID tag 80 is programmed to contain all the information regarding the bulk mail shipment. Tag 80 contains information about all the palettes contained within the shipment and shipper information. Tag 80 also contains information regarding the shipment's relationship to the mailing. Thus, tag 80 is programmed to contain all of the information connected to the mailing, including carriers, information about the mailing's destination, etc. In block 108, RFID tag 80 is attached to the mailing document and submitted to the post office.

In block 109, information pertaining to the previously programmed RFID tags is sent to and stored in a post office central computer. Then in block 110, bulk mail shipment arrives at the entry post office, where the tags are scanned to verify the integrity of the mailing and provide induction information such as time of arrival, time of acceptance and other related information to the post office. At this point in block 111, the scanned information is sent to and stored in the post office Central computer. Then in block 112, the post office breaks down and scans the palettes and sends the scanned information to the post office central computer. Now in block 113, the post office sends the palettes to distribution node post offices, where the palettes are further broken down and scanned. Next in block 114, the scanned information is sent to and stored in the post office Central computer. Then in block 115, the post office sends the mail trays to the appropriate local post offices. Now in block 116, the mail trays are scanned and the scanned information is sent to and stored in the post office central computer. Next in block 117, the mail pieces contained in the trays are delivered to the recipients.

The process of entering the information from the RFID tags into a central computer along with the information scanned by the post office from the RFID tags as the mail pieces move through the post office system provide an end-to-end trace of the movement of the mailing without having to process the mail pieces individually as they move through the system. This process also provides a beginning to end audit of the tracking of a mailing at the macro level as well as a systematic quality check from the creation of the mail piece to the delivery of the mail piece.

Figure 6:
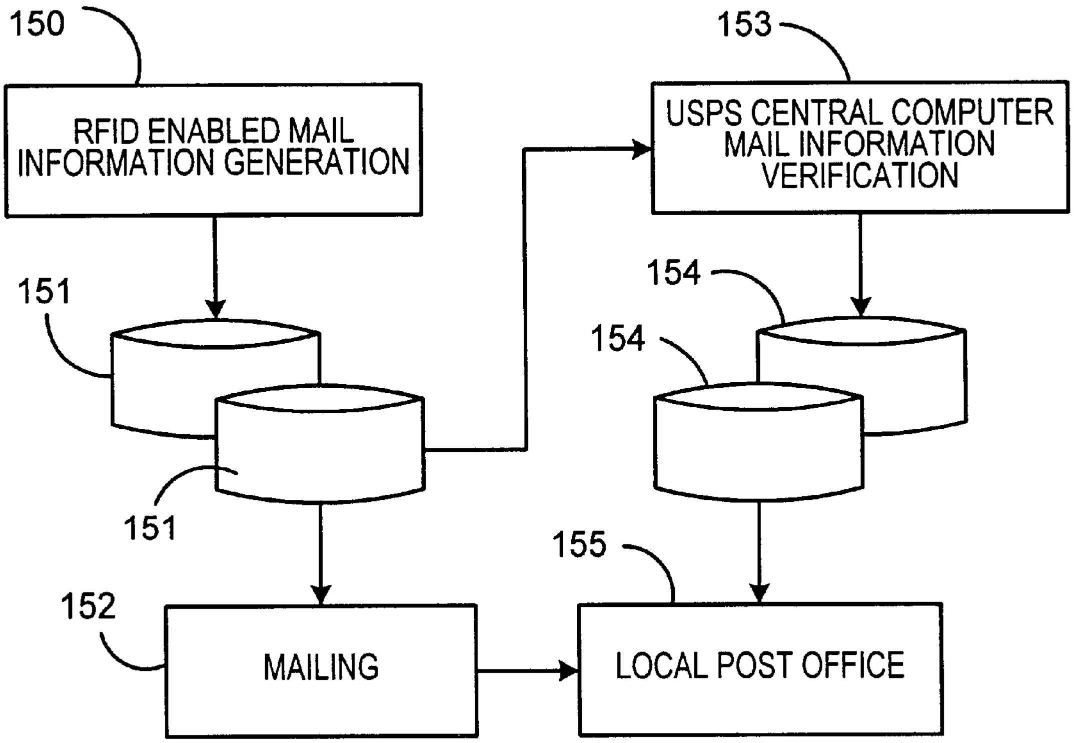
FIG. 6 is a drawing showing the data process steps that enable the post office to audit mailer quality and compliance while providing mail piece track-ability from creation to delivery of the mail piece.

FIG. 6 is a drawing showing the data process steps that enable the post office to audit mailer quality and compliance while providing mail piece track-ability from creation to delivery of the mail piece. The process begins in block 150 where a mailing is created, and RFID tags are enabled. As the mailing is assembled in a plurality of trays and palettes, the information that is programmed into the RFID tags is stored in a relational data bases 151. The information stored in data bases 151 provides a complete hierarchical view of the mailing. Once the mailing is completed, the information from data bases 151 is uploaded to a post office central computer in block 153, where mail validation information may be performed, such as mail piece face images, weight, etc., to provide the basis for mailers' discounts. As the electronic information regarding the mailing is provided to the post office in block 153, the physical mailing, i.e., mail pieces, trays and palettes are delivered to the entry post office.

As the mail is processed through the post office, data bases 154 will be updated with routing and handling information. Once the mailing reaches the local post offices in block 155, and is broken down and sorted for delivery, the mailer up charge for undelivered items is calculated and submitted to the mailer for payment.

The above specification describes a new and improved method for maintaining the integrity of a mailing. It is realized that the above description may indicate to those skilled in the art additional ways in which the principles of this invention may be used without departing from the spirit. Therefore, it is intended that this invention be limited only by the scope of the appended claims.

What is claimed is:

1. A method for processing mail, said method comprises the steps of:

A. placing a radio frequency identification tag on a mail piece that identifies the mail piece;

B. placing one or more mail pieces having a radio frequency identification tag in a tray;

C. placing a radio frequency identification tag on a tray that identifies the mail pieces in the tray;

D. placing one or more trays having radio frequency identification tags on a palette;

E. placing a radio frequency identification tag on a palette that identifies the trays in the palette; and F. scanning the radio frequency identification tags at specified times during the process to route the mailing.

2. The method claimed in claim 1, wherein the identification tag on the tray identifies the destination of the mail in the tray.

3. The method claimed in claim 1, wherein the identification tag on the tray identifies the sender of the mail pieces in the tray.

4. The method claimed in claim 1, wherein the identifier uniquely identifies the mail piece.

5. The method claimed in claim 4, wherein the unique identifier contains information integrity data.

6. The method claimed in claim 1, wherein the radio frequency tag on the mail piece indicates the value of the contents of the mail piece.

7. The method claimed in claim 6, wherein the value of the contents of the mail piece is encrypted.

8. The method claimed in claim 1, further including the steps of:

placing one or more palettes having radio frequency identification tags in a vehicle; and placing a radio frequency identification tag on the vehicle that identifies the palettes in the vehicle.

9. The method claimed in claim 8, wherein the radio frequency identification tag on the vehicle is programmed to contain information about the carrier.

10. The method claimed in claim 8, wherein the radio frequency identification tag on the vehicle is programmed to contain information about the mailings destination.

11. The method claimed in claim 8, wherein the radio frequency identification tag on the vehicle is attached to a mailing document.

12. The method claimed in claim 11, further including the step of:

submitting the mailing document to a carrier.

13. The method claimed in claim 12, further including the step of:

entering the information from the radio frequency identification tags into a central computer.

14. The method claimed in claim 13, further including the steps of:

entering the information scanned from the radio frequency identification tags as the mail pieces move through the delivery process to provide a end to end trace of the movement of the mailing.

15. The method claimed in claim 14, further including the step of:

auditing the scanned information to provide a quality check of the delivery of the mail piece.

16. The method claimed in claim 14, further including the step of:

notifying the sender of the information scanned.

* * * * *